(12) United States Patent
Mylar

(10) Patent No.: US 6,846,083 B1
(45) Date of Patent: Jan. 25, 2005

(54) TV SCREEN COVER

(76) Inventor: Jeffrey A. Mylar, 6231 Shadowcreek Dr., Carmichael, CA (US) 95608

( * ) Notice: Subject to any disclaimer, the term of this patent is extended or adjusted under 35 U.S.C. 154(b) by 0 days.

(21) Appl. No.: 10/759,836

(22) Filed: Jan. 20, 2004

(51) Int. Cl.$^7$ .................. G02B 21/00; G02B 27/00; H04N 5/72

(52) U.S. Cl. .................. 359/612; 359/601; 359/609; 348/834; 348/835

(58) Field of Search .................. 359/601–614, 359/800–830, 885–893; 348/834–842; 296/97.1–97.12

(56) References Cited

U.S. PATENT DOCUMENTS

| | | | | |
|---|---|---|---|---|
| 2,747,927 A | * | 5/1956 | Burkhead | 296/97.8 |
| 3,183,033 A | * | 5/1965 | Stulbach | 296/97.2 |
| 4,633,322 A | * | 12/1986 | Fourny | 348/834 |
| 4,823,859 A | * | 4/1989 | Park | 160/370.22 |
| 4,974,935 A | | 12/1990 | Lee | 359/601 |
| 5,016,937 A | * | 5/1991 | White | 296/97.7 |
| D360,199 S | | 7/1995 | Shu-Ying | D14/450 |
| 5,494,328 A | * | 2/1996 | Lehr | 296/97.6 |
| 5,519,458 A | | 5/1996 | King | 348/834 |
| 5,528,424 A | | 6/1996 | Lentz et al. | 359/612 |
| 5,852,513 A | | 12/1998 | McDole et al. | 359/580 |
| 6,144,418 A | | 11/2000 | Kappel et al. | 348/834 |

FOREIGN PATENT DOCUMENTS

DE 26 48 549 * 5/1978 .................. 359/601

* cited by examiner

*Primary Examiner*—Thong Q Nguyen

(57) ABSTRACT

A TV screen cover includes a cover member for reducing glare and volumes of light emitted from a TV. The TV screen cover further includes a housing positionable on top of a TV and securable thereto by a plurality of fastening members. The housing includes an elongated shaft with the cover member releasably wound thereabout. The housing has a slot disposed at a lower surface thereof and in front of a TV screen. The housing further includes a second elongated shaft adjacent the slot for guiding the cover member forwardly and downwardly through the slot. The cover member includes a rod connected to the bottom portion thereof and for assisting a user to uniformly move the cover member between wound and unwound positions. The TV screen cover further includes an attaching mechanism for selectively maintaining the cover member at an unwound position.

6 Claims, 3 Drawing Sheets

TV SCREEN COVER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to devices for reducing the glare and brightness of visual display screens and, more particularly, to a pull-down, retractable shade for television screens.

2. Prior Art

The growth of cable and satellite television has made the TV set one of the most, important items in modern homes. With hundreds of channels now available from all., over the world, the TV is an important source of news and entertainment for today's households. Twenty-four hour news and sports channels provide around the clock information. As a result, the TV occupies an important position in the home.

Unfortunately, the glare, reflections and flashes of brightness associated with television screens can cause problems. Because the TV set is now used more frequently than in the past, the glare, reflections and flashes of brightness frequently emitted from the TV may bother people in the room who are not watching the TV, but rather, are trying to read, sleep, or otherwise occupy themselves. Often, the TV cannot be positioned to avoid bothering these individuals.

A significant portion of television units currently in use or being sold does not have anti-glare and/or anti-reflective treatments. These TV sets typically experience the aforementioned problems. The TV sets that do provide some form of anti-glare treatment insufficiently address the issues of reflection or flashes of brightness that inevitably follow. For example, anti-glare treatments such as etching and silica sprays have been utilized, but these reduce the contrast of the television picture by scattering light across the front surface of the television cathode ray tube. In addition, the consumer cannot apply these treatments.

Another problem facing the television industry is that anti-reflection coatings typically cannot incorporate anti-glare coatings because these coatings degrade the resolution of the display. As a result, television manufacturers have not adequately addressed the problems noted above.

Accordingly, a need remains for a TV screen cover that reduces glare, reflection and flashes of brightness without interfering with the quality of the television picture. Also, a need remains for a TV screen cover that-simply reduces the volume of light that a TV produces while on.

BRIEF SUMMARY OF THE INVENTION

In view of the foregoing background, it is therefore an object of the present invention to provide a device for shading the glare, reflections and flashes of brightness of television screens. These and other objects, features, and advantages of the invention are provided by a TV screen cover including a housing positionable on top of a TV with an elongated first shaft having opposed end portions connected within the housing. A transparent cover member having a width extending along a length of the first shaft is releasably wound thereabout.

The housing further includes a bottom surface provided with a slot disposed in front of a TV screen and a plurality of fastening members, such as common suction cups as well known to a person of ordinary skill in the art, connected to the bottom surface of the housing for removably fastening same to a TV. An elongated second shaft disposed below the first shaft and adjacent the slot, guides the cover member forwardly and downwardly through the slot and along a TV screen.

The cover member further includes a rod connected to a bottom portion thereof that assists a user in uniformly moving the cover member between wound and unwound positions. The TV screen cover further includes a mechanism for attaching the cover member to a bottom portion of a TV so that the cover member becomes disposed in front of a TV screen for reducing glare and the volume of light emitted therefrom. In a preferred embodiment, such a mechanism may include Velcro material. Alternately, the mechanism may include a clip member connected to the TV and having an arcuate female portion for removably receiving the rod connected to the bottom portion of the cover member when same is at an unwound position.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in, connection with the accompanying drawings in which:

DETAILED DESCRIPTION OF THE INVENTION

Figure 1:
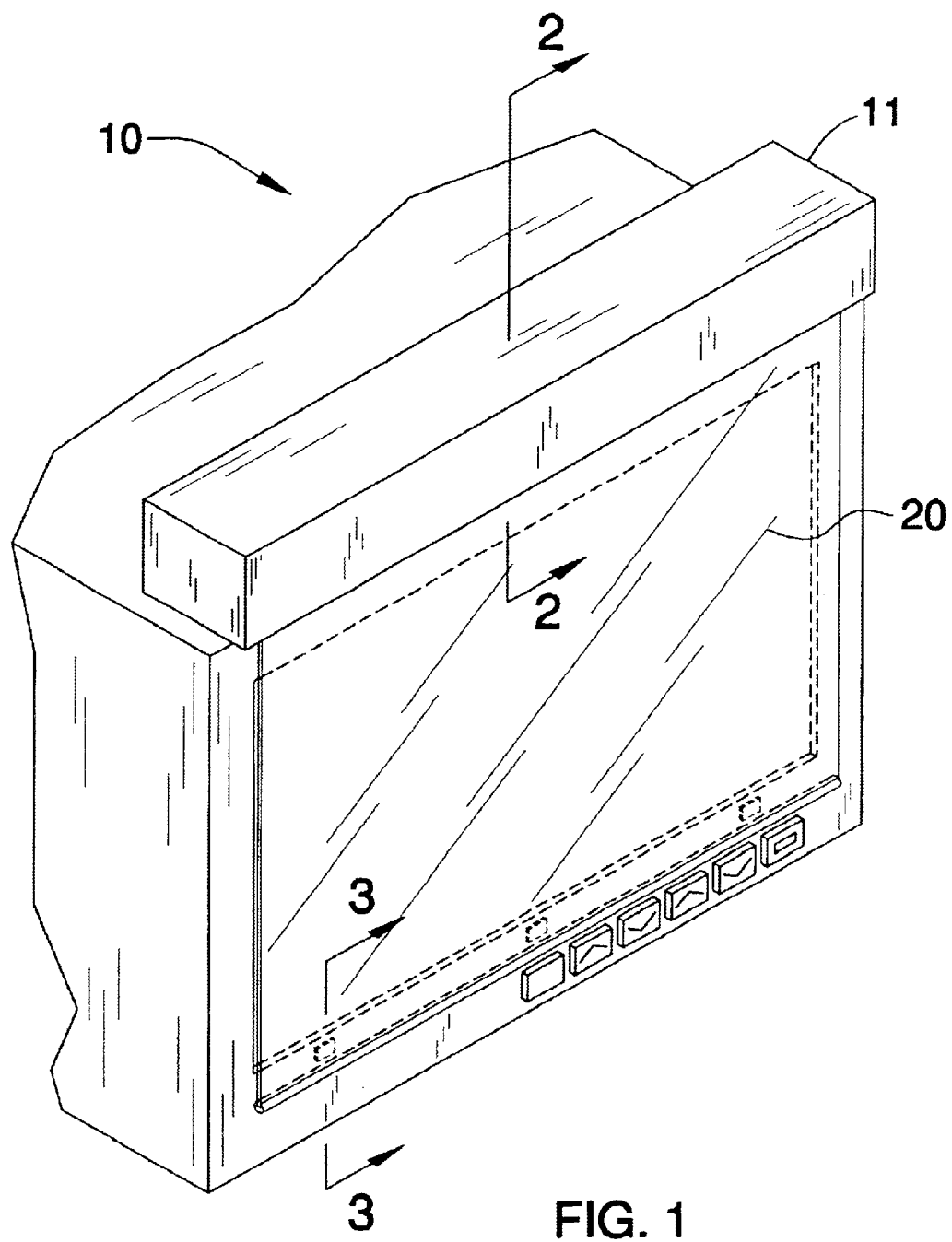
FIG. 1 is a perspective view showing a TV screen cover mounted on a TV in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

The device of this invention is referred to generally in FIGS. 1–5 by the reference numeral 10 and is intended to reduce the glare, reflections, flashes of brightness and volumes of light from TV screens. It should be understood that the TV screen cover 10 may be used on many different types of cathode ray tubes including computer monitors and should not be limited to television screens.

Referring to FIG. 1, the TV screen cover 10 includes a housing 11 positionable on top of a TV and including an elongated first shaft 12 having opposed end portions 13 connected within the housing 11. The housing 11 includes a bottom surface 14 provided with a slot 15 disposed in front of a TV screen. A plurality of fastening members 16, such as conventional suction cups, are connected to the bottom surface 14 of the housing 11 for removably fastening the housing 11 to a TV, as perhaps best shown in FIG. 4. Advantageously, the use of suction cups as fastening members 16 allows a user to easily disengage the TV screen cover 10 and move it to another TV.

Figure 2:
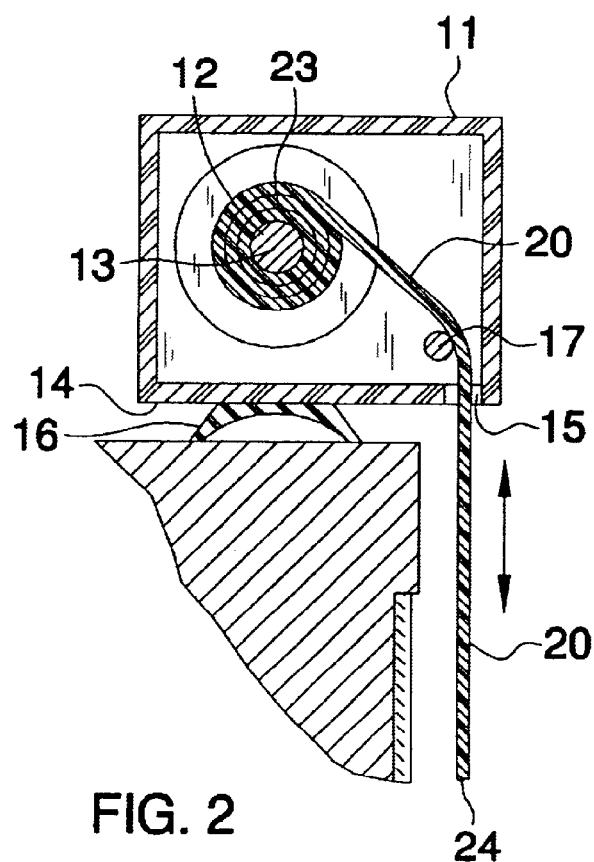
FIG. 2 is a cross-sectional view of the housing taken along line 2—2 in FIG. 1.
Figure 3:
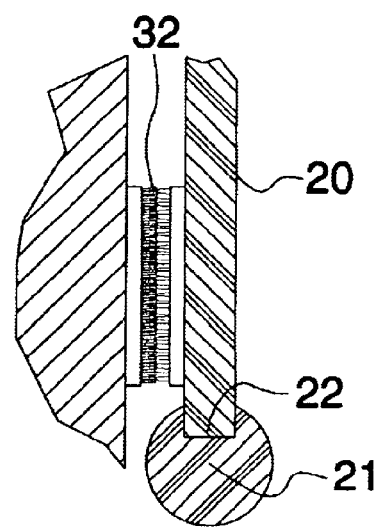
FIG. 3 is a cross-sectional view of the attaching mechanism taken along line 3—3 in FIG. 1.
Figure 4:
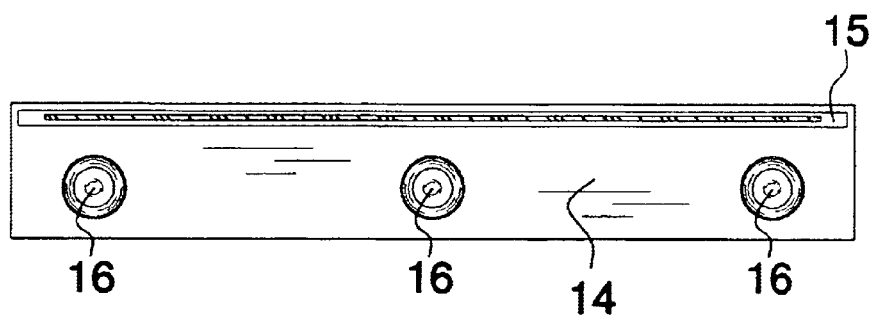
FIG. 4 is a bottom view of the housing.

Now referring to FIG. 2, the TV screen cover 10 further includes a cover member 20 having a width substantially equal to the length of the first shaft 12 and releasably wound about. The cover member 20 includes a rod 21 connected to a bottom portion 22 thereof for assisting a user to direct the cover member 20 through slot 15 and extend the cover member 20 substantially downwardly therefrom and along a TV screen between wound 23 and unwound 24 positions. The housing 11 further includes an elongated second shaft 17 disposed below the first shaft 12 and adjacent the slot 15 for assisting to guide the cover member 20 forwardly and downwardly through slot 15.

Figure 5:
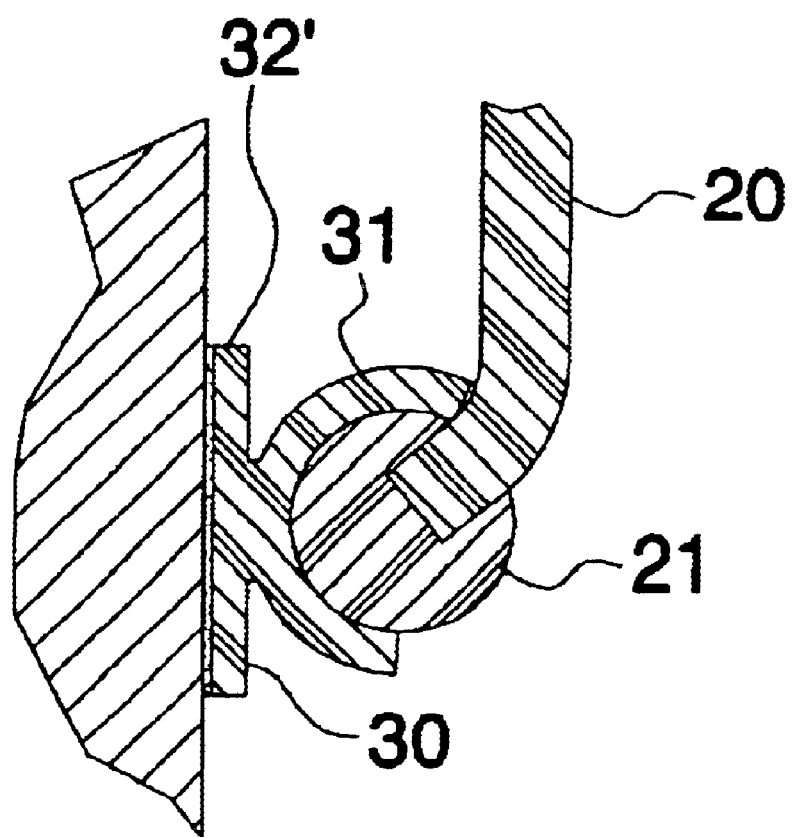
FIG. 5 is a cross-sectional view showing an alternate embodiment of the attaching mechanism shown in FIG. 3.

Now referring to FIG. 5, the TV screen cover 10 further includes a mechanism 32 for attaching the cover member 20 to a bottom portion of a TV screen so that the cover member 20 becomes disposed in front of a TV screen for reducing glare emitting therefrom. In a preferred embodiment, as perhaps best shown in FIG. 3, a plurality of Velcro members are disposed at bottom portions of a TV and the cover member 20, respectively. Such Velcro members are substantially alignable with each other and are releasably attachable so that the cover member 20 can be maintained at an unwound position. In an alternate embodiment, as perhaps best shown in FIG. 5, the attaching mechanism 32 may include a clip member 30 connected to a TV and having an arcuate female portion 31 for removably receiving the rod 21 therein and for attaching the cover member 20 to a bottom portion of a TV so that the cover member 20 becomes disposed in front of a TV screen.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, material, shape, form, function and manner of operation. The assembly and use of the present invention are deemed readily apparent and obvious to one skilled in the art.

What is claimed is:

1. A television screen cover comprising:
   a housing positionable on top of a television adjacent a front face thereof, said housing including an elongated first shaft having opposed end portions connected within said housing, said housing further having a bottom surface provided with a slot disposed in front of a television screen;
   a permeable cover member having a width extending along a length of said first shaft and being releasably wound thereabout, said cover member passing through said slot and extending substantially downwardly therefrom and along a television screen, said cover member including a rod connected to a bottom portion thereof and for assisting a user to uniformly move said cover member between wound and unwound positions such that said cover member can be guided downwardly along the front face of the television;
   a plurality of non-corrosive fastening members connected to said bottom surface of said housing and for removably fastening same to a television;
   means for attaching said cover member to a bottom portion of a television so that said cover member becomes disposed in front of a television screen for reducing glare emitting therefrom; and
   an elongated second shaft disposed within said housing and below said first shaft and adjacent said slot, said second shaft guiding said cover member forwardly and downwardly through said slot.

2. The television screen cover of claim 1, wherein said plurality of fastening members comprise suction cups.

3. The television screen cover of claim 1, wherein said attaching means comprises Velcro material.

4. The television screen cover of claim 1, wherein said attaching means comprises a clip member connected to a television and having an arcuate female portion for removably receiving said rod therein.

5. A television screen cover comprising:
   a housing positionable on top of a television adjacent a front face thereof, said housing including an elongated first shaft having opposed end portions connected within said housing, said housing further having a bottom surface provided with a slot disposed in front of a television screen;
   a permeable cover member having a width extending along a length of said first shaft and being releasably wound thereabout, said cover member passing through said slot and extending substantially downwardly therefrom and along a television screen, said cover member including a rod connected to a bottom portion thereof and for assisting a user to uniformly move said cover member between wound and unwound positions such that said cover member can be guided downwardly along the front face of the television;
   a plurality of non-corrosive fastening members connected to said bottom surface of said housing and for removably fastening same to a television;
   means for attaching said cover member to a bottom portion of a television so that said cover member becomes disposed in front of a television screen for reducing glare emitting therefrom, said attaching means including Velcro material; and
   an elongated second shaft disposed within said housing and below said first shaft and adjacent said slot, said second shaft for cooperating with said first shaft to guide said cover member forwardly and downwardly through said slot wherein said second shaft has a length substantially equal to a length of said first shaft.

6. The television screen cover of claim 5, wherein said plurality of fastening members comprise suction cups.

* * * * *

UNITED STATES PATENT AND TRADEMARK OFFICE
CERTIFICATE OF CORRECTION

PATENT NO.        : 6,846,083 B1                                     Page 1 of 1
APPLICATION NO. : 10/759836
DATED             : January 25, 2005
INVENTOR(S)       : Jeffrey A. Myler It is certified that error appears in the above-identified patent and that said Letters Patent is hereby corrected as shown below:

TITLE PAGE [75]
CORRECT SPELLING OF INVENTOR'S LAST NAME: MYLER

Signed and Sealed this

First Day of May, 2007

JON W. DUDAS
*Director of the United States Patent and Trademark Office*